Aug. 24, 1943.　　　C. N. REAVIS　　　2,327,559
EMERGENCY AND PARKING BRAKE
Filed Aug. 18, 1941　　　3 Sheets-Sheet 1
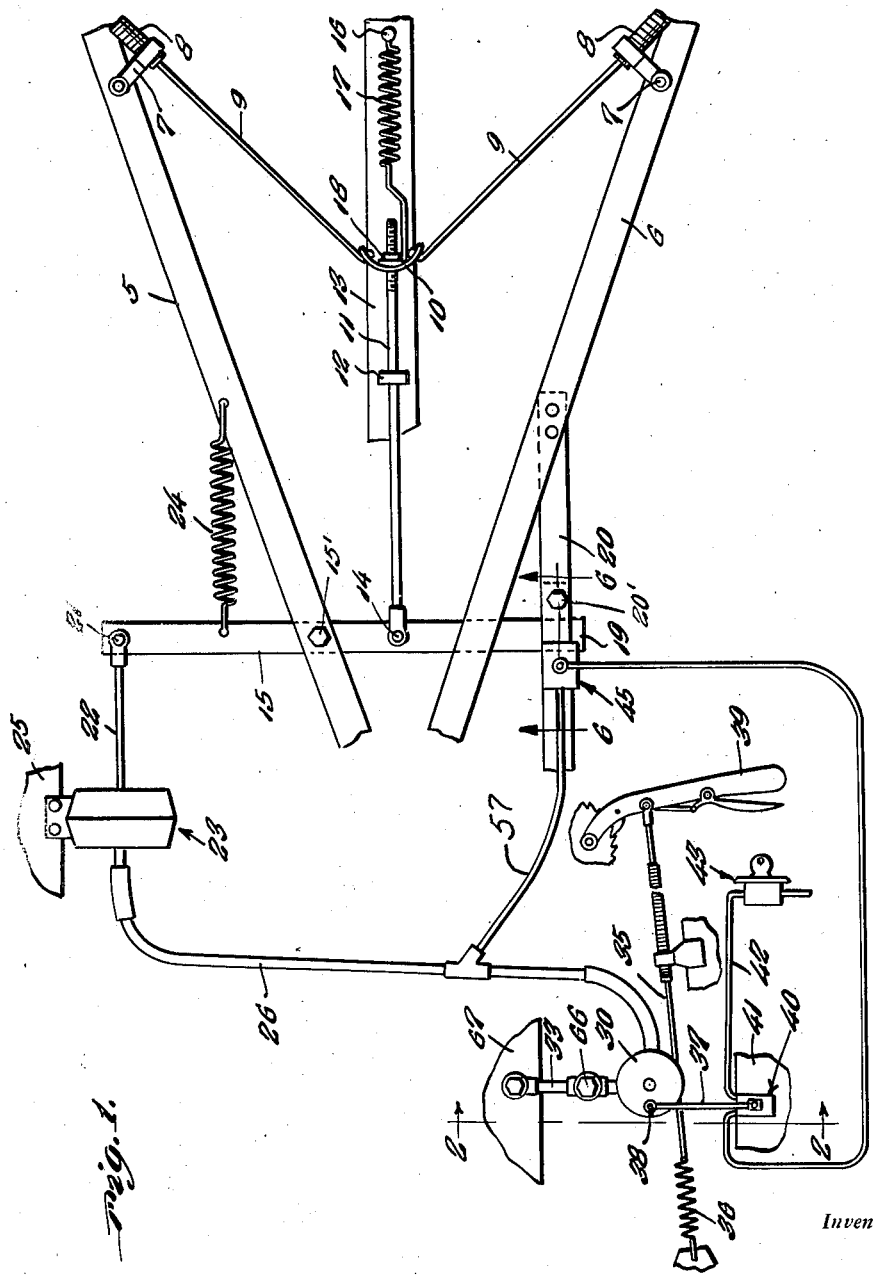
Inventor
Charles N. Reavis
By Clarence A. O'Brien
Attorney Aug. 24, 1943.  C. N. REAVIS  2,327,559
EMERGENCY AND PARKING BRAKE
Filed Aug. 18, 1941  3 Sheets-Sheet 2
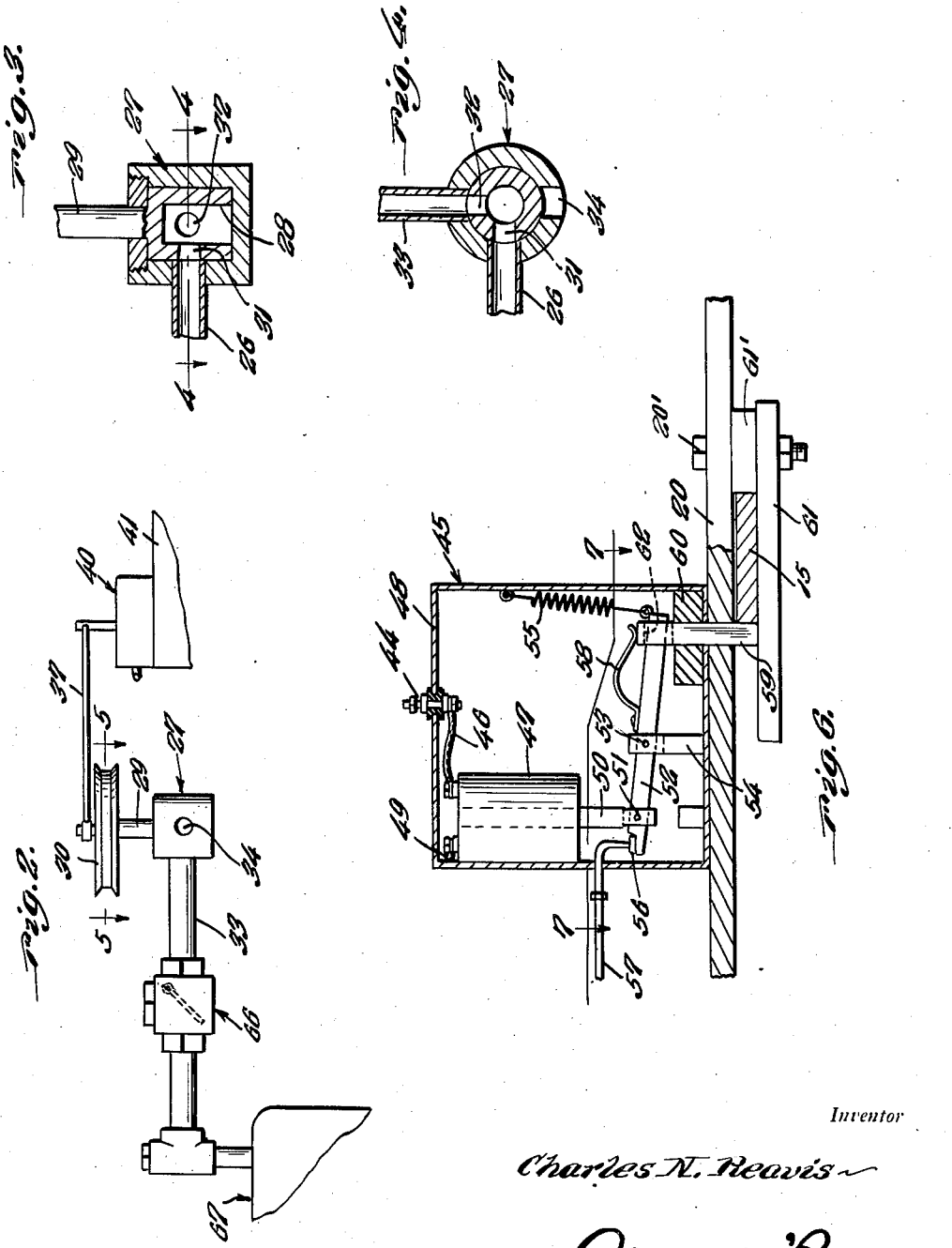
Inventor
Charles N. Reavis
By Clarence A. O'Brien
Attorney

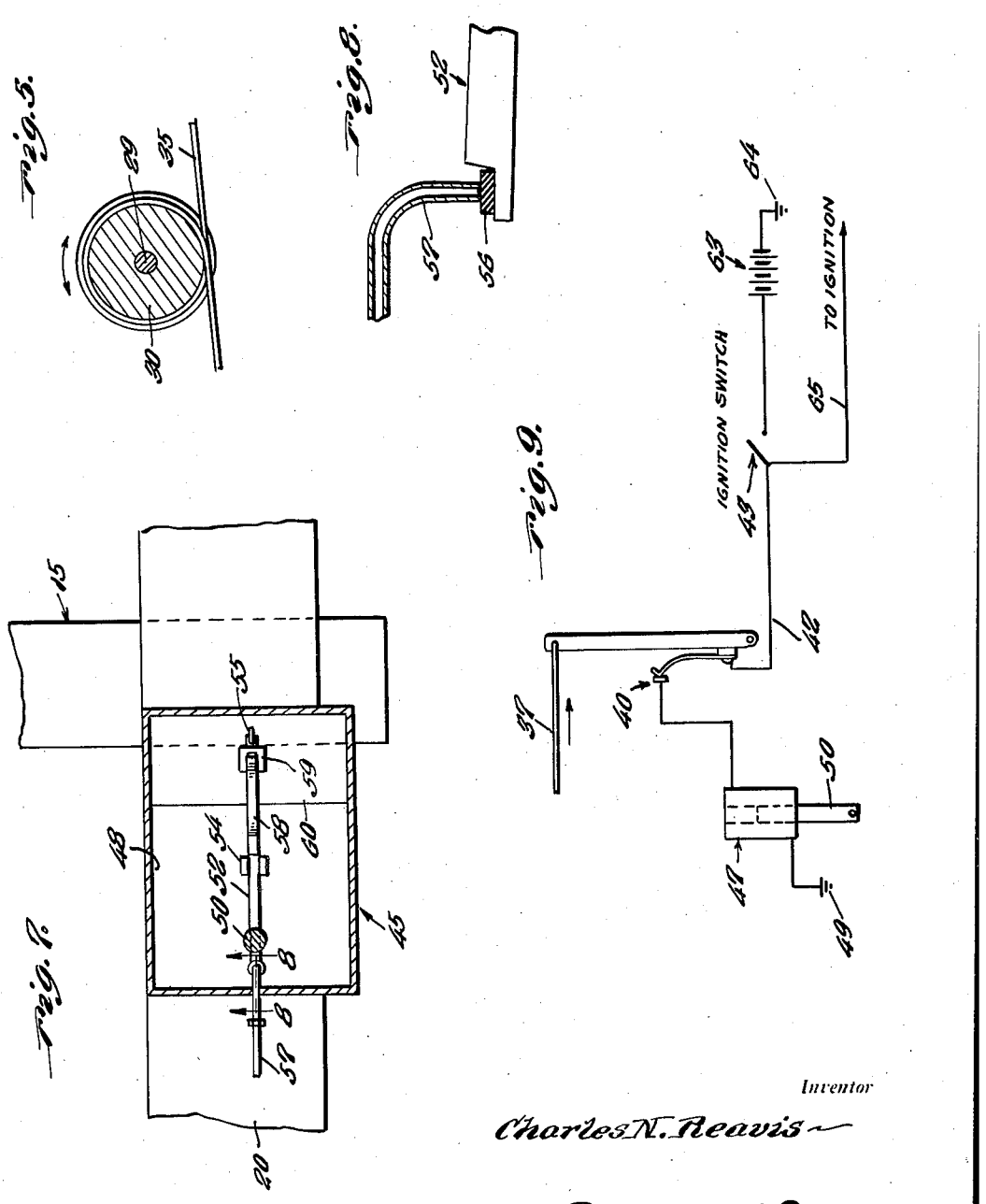

Patented Aug. 24, 1943

2,327,559

UNITED STATES PATENT OFFICE 2,327,559

EMERGENCY AND PARKING BRAKE

Charles N. Reavis, Raleigh, N. C., assignor of two-thirds to Silas B. Coley, Raleigh, N. C.

Application August 18, 1941, Serial No. 407,362

5 Claims. (Cl. 192—3)

My invention relates to improvements in automobile emergency and parking brakes, and particularly to a brake of this type which is automatically applied and stays in applied condition whenever the ignition system of the engine is broken, and the primary object of my invention is to provide a simple and efficient arrangement of this character which provides a powerful and effective braking and car holding means operative entirely independently of the service brake system, so as to be operative even though such service brake system fail.

Another important object of my invention is to provide a brake of the character indicated which cannot be released by unauthorized persons or through mechanical failure of the usual emergency brake lever and attendant mechanism, but which can be fully applied to slow down and stop and hold the automobile, even on a steep downgrade simply by the turning off of the ignition key by the driver, without attention to any other operations, so as to safely park the automobile.

Other important objects and advantages of my invention will be apparent from a reading of the following description taken in connection with the appended drawings, wherein for purposes of illustration I have shown a preferred embodiment of my invention.

In the drawings:

Figure 1 is a general schematic representation of the embodiment showing the essential components and their mechanical and electrical relationships.

Figure 2 is a fragmentary elevational view taken along the line 2—2 of Figure 1 and looking toward the right in the direction of the arrows.

Figure 3 is a transverse vertical sectional view taken through the three-way valve.

Figure 4 is a horizontal sectional view taken through Figure 3 along the line 4—4 and looking downwardly in the direction of the arrows.

Figure 5 is a fragmentary longitudinal sectional view taken through Figure 2 along the line 5—5 and looking in the direction of the arrows.

Figure 6 is an enlarged vertical longitudinal sectional view taken through the solenoid valve casing and approximately along the line 6—6 of Figure 1 and looking upwardly in the direction of the arrows.

Figure 7 is a horizontal sectional view taken through Figure 6 along the line 7—7 and looking downwardly in the direction of the arrows.

Figure 8 is a fragmentary enlarged sectional elevational view of the vacuum bleeder valve.

Figure 9 is a schematic wiring diagram showing the electrical connections with the battery and ignition circuits of the automobile.

While the present device is especially adapted for use with automobiles equipped with fluid drive or hydromatic transmissions, it is equally applicable to automobiles having conventional or mechanically operated gear shifts.

Referring in detail to the drawings, the numerals 5 and 6 refer to lateral members of a conventional automobile chassis on which are bracketed as indicated by the numerals 7 the cable conduits 8 of the mechanical emergency brake system, which lead to the rear wheel brakes (not shown) of the automobile in a conventional manner. The brake cables 9 lead forwardly from the conduits 8 to a yoke 10 which is adjustably threaded on a drawbar 11 which is slidably mounted in a bracket 12 fixed on a centralized chassis member 13 and pivotally connected at its forward end as indicated by the numeral 14 to a transversely arranged brake applying bar 15 which is pivoted at 15' on the chassis member 5. Between the yoke 10 and a pin 16 on the chassis member 13 is stretched a coiled spring 17 operating to keep the yoke 10 pressed back against the stop 18 which can be adjusted to position the yoke 10 along the drawbar 11. The brake applying bar 15 has the end 19 slidably mounted below a longitudinal bracket 20 which projects forwardly from the chassis member 6. The bar 15 has its opposite end pivoted as indicated by the numeral 21 to the pull rod 22 which is operated by the vacuum diaphragm cylinder 23. A brake applying spring 24 is stretched between a point on the bar 15 between the pivot 21 and the pivot 15' and a rearwardly disposed point on the chassis side member 5. The vacuum cylinder 23 is mounted stationarily as indicated on a suitable portion 25 of the chassis. A bolt 20' traverses and assembles on the bracket 20 a combined spacer and stop 61' and thereunder a slide bar 61 on which the end of the brake applying bar 15 slidably rests in front of the stop 61'.

A main vacuum line 26 leads from the vacuum cylinder 23 to the three-way valve which is generally designated 27 whose cup-shaped valve element 28 is secured on the shaft 29 on which is fixed the cable operated pulley wheel 30. The valve element 28 has the ports 31 and 32 located ninety degrees apart, with the main vacuum pipe 26 to be registered by the port 31 or the port 32, and the supplementary vacuum pipe 33 to be registered with the port 32. An open port 34 in the casing of the valve is adapted to be registered by the valve element port 31 to exhaust to the atmosphere the vacuum subsisting in the pipe 26. It will be evident that while the port 32 is registered with the pipe 26 the port 31 will be registered with the open port 34, and that while the ports 31 and 32 are registered with the pipes 26 and 33 the open port 34 will be closed, and an open path for the vacuum will exist between the pipe 26 and the pipe 33, which is the normal position of the valve.

The valve 27 is operated either by the emergency hand brake cable 35 which is wound around the periphery of the pulley wheel 30 and possessed of a spring anchor 36 to the dashboard of the driver compartment of the automobile, or by the connecting rod 37 which has an eccentric connection 38 with the outer side of the pulley wheel 30 in a manner to be described. The emergency brake cable 34 is conventionally connected to a conventional emergency brake handle 39 mounted in the driving compartment of the automobile.

The lower end of the connecting rod 37 is operatively connected to the switch arm of a circuit breaker 40 which is mounted on a suitable portion 41 of the automobile, the circuit breaker 40 being placed in the element 42 of the ignition circuit in which also is connected the usual ignition switch 43, so that with the ignition switch in the "on" position the circuit breaker 40 can operate to break the existing electrical circuit or can operate to restore the same depending upon the operation of the pulley wheel 30 by the manipulation of the emergency brake hand lever 39. The portion 42 of the ignition battery circuit of the automobile leads to the terminal 44 of the control box which is generally designated 45 and which is mounted at a suitable portion such as the portion 20 of the chassis. The terminal 44 is connected as indicated by the numeral 46 with one end of the winding of a vertical solenoid 47 which is mounted in the case 48 and has the opposite end of its winding grounded to the case as indicated by the numeral 49. The solenoid has a vertically operating core 50 which is pivoted as indicated by the numeral 51 to a point near one end of the combined valve arm and switch arm which is generally designated 52 and which is pivotally mounted as indicated by the numeral 53 on a bracket 54 in the case 48. A contractile spring 55 is stretched between an upper part of the case 48 and the right hand end of the arm 52 to normally depress the left hand end of the arm 52. The arm 52 is shown in Figure 6 of the drawings as in operated position in which its valve element 56 is in closing relation to the lower open end of the small vacuum bleeder pipe 57 as illustrated in detail in Figure 8 of the drawings. Mounted on the central portion of the arm 52 and extending toward the right hand end thereof is the upwardly bowed lock pin spring 58 which bears down upon the upper end of the locking pin 59 which is mounted for vertical sliding movement through openings formed in the block 60 in the case 48, and the bracket 20 so as to occupy in its depressed condition, a position in front of the left hand end of the brake operating bar 15 so as to positively prevent further forward movement of this end of the bar 15. In the raised position of the pin 59 it is freed from the bar 15 allowing the bar 15 to move forwardly. The right hand end of the arm 52 works more or less freely from a slot 62 formed adjacent the upper end of the pin 59, thereby allowing a certain amount of lost motion which is cushioned by the spring 58, in the operation of the pin 59.

As shown in Figure 9 of the drawings the car battery 63 has one side thereof grounded to the chassis as indicated at 64 and has its opposite side connected to the ignition switch 43 from which extends the mentioned circuit component 42 in which is located the circuit breaker 40 between the ignition switch and the solenoid 47, the latter having one side grounded at 49 as already described. Also connected to the ignition switch is the line 65 leading to the primary of the ignition circuit (not shown).

The supplementary vacuum pipe 33 has a check valve 66 therein and this is connected to the vacuum supply 67 which may be of any suitable type or be the suction manifold of the automobile engine.

Assuming that the automobile engine is in operation and the hand brake is in the released or off condition, and the driver wishes to park the automobile, the automobile is braked by the use of the ordinary service brake system to a standstill and the ignition key of the ignition switch 43 is turned to the off position. This deenergizes the solenoid 47, thereby allowing the left hand end of the arm 52 to drop and uncover the open lower end of the small bleeder tube 57. This slowly bleeds the vacuum cylinder 23. The same movement of the arm 52 withdraws the locking pin 59 upwardly, thereby allowing the brake applying bar 15 to move forwardly due to the tension of the spring 24 and apply the emergency brake. In the arrangement shown the full operation does not go into effect until about six seconds after the ignition switch has first been turned off.

To again drive the car and release the brakes, the ignition key is turned on so as to pass current from the ignition switch through the wire 42 to the solenoid. This energizes the solenoid 47 and brings up the left hand end of the arm 52, resulting in closing of the open end of the bleeder pipe 57 by the valve 56. Downward movement of the locking pin 59 is obstructed in this arrangement of parts by the presence of the bar 15 under it, but the slot 62 in the pin 59 is long enough to permit the right hand end of the arm 52 to subside relative to the pin 59 to permit the valve 56 to seat against the lower end of the bleeder pipe 57 and close it, despite the elevated position of the pin 59. When sufficient vacuum is developed in the cylinder 23, the brake operating bar 15 moves in a rearward direction a sufficient distance to allow the pin 59 to drop into the depressed locking position shown in Figure 6 of the drawings, so that should accidental damage occur to the vacuum tubing or rupture of the diaphragm of the cylinder 23 while the car is operating at high speed, the emergency brake will not become applied without warning to the driver so as to cause an accident.

To operate the emergency brake in case of an emergency or to hold the vehicle on a hill with the engine of the automobile running, the emergency brake lever 39 is pulled rearwardly or upwardly in the ordinary way. This causes the cable 35 to operate the pulley wheel 30 in a counter-clockwise direction, so as to open the circuit breaker 40, deenergize the solenoid 47 and permit the locking pin 59 to be withdrawn to inoperative position, thereby allowing the spring 24 to swing the left hand end of the bar 15 forwardly. In the position of the three-way valve 27 achieved by the operation of the brake handle 39 the main vacuum pipe 26 is connected in communication with the open port 34, so that the vacuum cylinder 23 is instantly bled of vacuum and the suction source 67 is cut off.

To release the brakes applied in the manner described immediately above, the lever 39 is released downwardly or forwardly in the usual way. This results in rotating the pulley wheel 30 in a clockwise direction due to the contracting action of the spring 36. This rotation of the pulley wheel operates the three-way valve 27 so that communication is established between the vacuum source and the vacuum cylinder. This operates to cause the vacuum cylinder to overcome the tension of the brake applying spring 24, thereby releasing the brakes, and the same action closes the circuit breaker 40 so as to energize the solenoid 47.

Should the automobile run out of gasoline and the motor thereof stop from this cause rather than from a shutting off of the ignition system and it becomes necessary to release the emergency or parking brakes so that the automobile may be pushed to a service station, the driver should keep the ignition switch in the "on" position for several minutes or a sufficiently long time to enable the diaphragm, the check valve, and connections to leak enough to permit the left hand end of the brake applying bar 15 a slight forward movement, restricted by the depressed position of the locking pin 59 against which the bar 15 is held by the pull of the spring 24. The ignition switch is then turned off and the brake remains in the off position until such time as the engine is started again.

Although I have shown and described the preferred embodiment of my invention, it is to be definitely understood that I do not wish to limit the application of the invention thereto except as may be required by the scope of the subjoined claims.

Having thus described my invention, what is claimed as new is:

1. Applying means for the emergency and parking brakes of an automobile, said automobile having an engine including an intake manifold, and a battery and ignition circuit involving an ignition switch, said applying means comprising a vacuum cylinder in communication with said intake manifold and having operative connection with the said brakes, said vacuum cylinder being arranged to function to hold the said brakes unapplied while the engine is running, and a brake applying spring connected to apply and hold the brakes applied while said engine is in an inoperative condition and there is insufficient suction in the intake manifold, said circuit including an electromagnetically operated bleeder valve for said vacuum cylinder, said bleeder valve being arranged to be closed while said circuit is energized and to be open whenever said circuit is deenergized, the aperture of said bleeder valve being proportioned to bleed said vacuum cylinder to the atmosphere when said bleeder valve is open at a rate commensurate with the desired rate of application of the brakes following stopping of the engine.

2. Applying means for the emergency and parking brakes of an automobile, said automobile having an engine including an intake manifold, and a battery and ignition circuit involving an ignition switch, said applying means comprising a vacuum cylinder in communication with said intake manifold and having operative connection with the said brakes, said vacuum cylinder being arranged to function to hold the said brakes unapplied while the engine is running, and a brake applying spring connected to apply and hold the brakes applied while said vacuum cylinder is inoperative due to inoperative condition of said engine, said ignition switch being arranged to deenergize the ignition circuit in its off position to render the engine inoperative and permit application of the brakes by said spring, a manually operated three-way valve connected in communication between said intake manifold and said vacuum cylinder, said three-way valve having a first port connected to said intake manifold, a second port connected to said vacuum cylinder, and a third port opening to the atmosphere, said three-way valve having a hollow rotary valve core having a pair of circumferentially spaced ports adapted to be selectively registered with two of said first, second, and third ports to establish communication between said manifold and the vacuum cylinder to operate the same, or to close off said manifold from said vacuum cylinder and establish communication between said vacuum cylinder and the atmosphere for quick-bleeding of said vacuum cylinder.

3. Applying means for the emergency and parking brakes of an automobile, said automobile having an engine including an intake manifold, and a battery and ignition circuit involving an ignition switch, said applying means comprising a vacuum cylinder connected to said intake manifold and having connection with the said brakes, said vacuum cylinder being arranged to hold the said brakes unapplied while the engine is running, and a brake applying spring connected to apply and hold the brakes applied while said vacuum cylinder is inoperative due to inoperative condition of said engine, said ignition switch being arranged to deenergize the ignition circuit in its off position to render the engine inoperative and permit application of the brakes, a manually operated three-way valve connected in communication between said intake manifold and said vacuum cylinder, said three-way valve having a first part connected to said intake manifold, a second part connected to said vacuum cylinder, and a third part opening to the atmosphere, said three-way valve having a hollow rotary valve core having a pair of circumferentially spaced parts adapted to be selectively registered with two of said first, second, and third parts to establish communication between said manifold and the vacuum cylinder to operate the same, or to close off said manifold and establish communication between said vacuum cylinder and the atmosphere for quick-bleeding of said vacuum cylinder, a normally closed circuit breaker connected in said circuit in advance of said ignition switch, said circuit breaker having operative connection with said three-way valve whereby said circuit breaker is opened to deenergize said circuit substantially when said three-way valve is manually operated into position to quick-bleed said cylinder.

4. Applying means for the emergency and parking brakes of an automobile, said automobile having an engine including an intake manifold, and a battery and ignition circuit involving an ignition switch, said applying means comprising a vacuum cylinder in communication with said intake manifold and having operative connection with the said brakes, said vacuum cylinder being arranged to function to retract the said brakes from applied position while the engine is running and produces sufficient suction in said manifold, and a brake applying spring connected to apply and hold the brakes applied while said engine is in an inoperative condition and there is insufficient suction in the manifold, said ignition switch being arranged to deenergize the ignition circuit in its off position to render the engine inoperative and permit application of the brakes by said spring, a manually operated three-way valve connected in communication between said intake manifold and said vacuum cylinder, said three-way valve having a first port connected to said intake manifold, a second port connected to said vacuum cylinder, and a third port opening to the atmosphere, said three-way valve having a hollow rotary valve core having a pair of circumferentially spaced ports adapted to be selectively registered with two of said first, second, and third ports to establish communication between said manifold and the vacuum cylinder to operate the latter, or to close off said manifold from the vaccum cylinder and establish communication between said vacuum cylinder and the atmosphere for quick-bleeding of said vacuum cylinder, a normally closed circuit breaker connected in said circuit in advance of said ignition switch, said circuit breaker having operative connection with said three-way valve whereby said circuit breaker is opened to deenergize said circuit substantially when said three-way valve is manually operated into position to quick-bleed said cylinder, and an electromagnetically operated slow-bleeder valve in communication with the vacuum cylinder, said slow-bleeder valve being closed while said circuit is energized and adapted to open to slowly bleed the vacuum cylinder following a manual application of the brakes and deenergizing of said circuit.

5. Applying means for the emergency and parking brakes of an automobile, said automobile having an engine including an intake manifold, and a battery and ignition circuit involving an ignition switch, said applying means comprising a vacuum cylinder in communication with said intake manifold and having operative connection with the said brakes, said vacuum cylinder being arranged to function to retract the said brakes from applied position while the engine is running, and a brake applying spring connected to apply and hold the brakes applied while said engine is in an inoperative condition and there is insufficient suction in the manifold to actuate the vacuum cylinder, said circuit including an electromagnetically operated slow-bleeder valve for said vacuum cylinder, said slow-bleeder valve being arranged to be closed while said circuit is energized and to be open to the atmosphere while said circuit is deenergized, the aperture of said slow-bleeder valve being proportioned to bleed said vacuum cylinder to the atmosphere at a rate commensurate with the desired rate of application of the brakes following stopping of the engine, said slow-bleeder valve including a locking element in operative position while said circuit is closed and adapted to move to inoperative position upon opening of said slow-bleeder valve, said locking element being arranged to engage a portion of said brakes to positively prevent application of the brakes by said spring while the engine is operating upon failure of any other active component of the applying means.

CHARLES N. REAVIS.